(12) United States Patent
Nishide et al.

(10) Patent No.: US 7,528,989 B2
(45) Date of Patent: May 5, 2009

(54) IMAGE PROCESSING APPARATUS AND IMAGE PROCESSING METHOD

(75) Inventors: Yasushi Nishide, Ebina (JP); Ryuichi Ishizuka, Ebina (JP); Mari Kodama, Ebina (JP); Toshifumi Takahira, Ebina (JP)

(73) Assignee: Fuji Xerox Co., Ltd, Tokyo (JP)

( * ) Notice: Subject to any disclaimer, the term of this patent is extended or adjusted under 35 U.S.C. 154(b) by 885 days.

(21) Appl. No.: 10/885,656

(22) Filed: Jul. 8, 2004

(65) Prior Publication Data

US 2006/0007510 A1 Jan. 12, 2006

(51) Int. Cl.
*G06F 15/00* (2006.01)
*G06K 1/00* (2006.01)

(52) U.S. Cl. ............ 358/1.9; 358/3.06; 358/3.23; 358/502; 358/503; 382/162; 382/165

(58) Field of Classification Search ......... 358/1.9, 358/3.24, 3.01, 500, 501, 515, 518, 523, 358/525, 529, 530; 345/589, 591, 601–604, 345/606; 382/162, 167
See application file for complete search history.

(56) References Cited

U.S. PATENT DOCUMENTS

| | | | | |
|---|---|---|---|---|
| 6,310,969 | B1 * | 10/2001 | Kim et al. | 382/162 |
| 6,529,291 | B1 * | 3/2003 | Schweid et al. | 358/1.9 |
| 6,633,409 | B1 * | 10/2003 | Yamazaki | 358/1.9 |
| 6,650,336 | B2 * | 11/2003 | Suzuki | 345/589 |
| 6,701,007 | B1 * | 3/2004 | Yamaguchi | 382/162 |
| 6,970,606 | B2 * | 11/2005 | Lee et al. | 382/270 |
| 7,023,582 | B2 * | 4/2006 | Sawada et al. | 358/1.9 |
| 2002/0176105 | A1 * | 11/2002 | Kawai et al. | 358/1.9 |
| 2004/0227977 | A1 * | 11/2004 | Yoshida | 358/3.01 |
| 2006/0238615 | A1 * | 10/2006 | Shigeta | 348/98 |
| 2006/0290957 | A1 * | 12/2006 | Kim et al. | 358/1.9 |
| 2007/0070474 | A1 * | 3/2007 | Hiramatsu | 358/540 |
| 2007/0291312 | A1 * | 12/2007 | Kaneko et al. | 358/2.1 |

FOREIGN PATENT DOCUMENTS

| | | |
|---|---|---|
| JP | A 9-27915 | 1/1997 |
| JP | A-09-214789 | 8/1997 |
| JP | A-2002-152537 | 5/2002 |
| JP | A-2002-305665 | 10/2002 |
| JP | B2 3359070 | 10/2002 |
| JP | A-2002-330303 | 11/2002 |

* cited by examiner

*Primary Examiner*—Edward L Coles
*Assistant Examiner*—Satwant K Singh
(74) *Attorney, Agent, or Firm*—Oliff & Berridge, PLC

(57) ABSTRACT

An image processing apparatus and an image processing method which perform image processing for drawing information which includes image information and color correction information are provided. The image processing apparatus according to the invention includes a first conversion component which converts a predetermined first color component value in a color space applied by the drawing information into a second color component value in a different color space while being corrected by the color correction information, a decision component which determines whether the second color component value is a value falling within a predetermined range or not, and a second conversion component which performs conversion of color components used in image drawing based on the drawing information into a single color corresponding to the range.

11 Claims, 11 Drawing Sheets

FIG. 5

```
<<
/ColorRenderingType 1
/CRDName (General)
:
:
/EncodeLMN
[
{0.9505 div dup 0.08856 gt {1 3 div exp}{7.787 mul 16 116 div add} ifelse}
{dup 0.00856 gt {1 3 div exp}{7.787 mul 16 116 div add} ifelse}
{1.089 div dup 0.008856 gt {1 3 div exp}{7.787 mul 16 116 div add} ifelse}
]
/RangeLMN
[0 2 0 1 0 5]
/MatrixABC
[
0  1  0
1 -1  1
0  0 -1
]
/EncodeABC
[
{116 mul 16 sub}
{500 mul}
{200 mul}
]
/RangeABC
[0.0 100.0 -128.0 128.0 -128.0 128.0]
/RenderTable
[
21 21 21[
<FF93 82CE FF91 82CE FF8F 86CE ··· 38FF E7C4 35FD EBC5>
<FF97 81C1 FF96 81BE FF93 84BB ··· 53FF FF91 52FF FF92>
<FF98 7BA1 FF97 7C9C FF94 8098 ··· 61FF FF69 60FF FF6A>
...
< 4000 0000 4000 0000 4100 0000 ···2F00 0036 3100 0035 3400>
]
4
% cyan output tables
{
}bind
% magenta output tables
{
}bind
% yellow output tables
{
}bind
% black output tables
{
}bind
]
>>
/General exch /ColorRendering defineresource pop
%%EndResource
```

PREPARATION REGION TO DERIVE L*a*b* VALUE

↕

REGION TO OUTPUT CMYK VALUE

FIG. 7

```
[/CIEBasedABC
<<
/RangeABC [0 255 0 255 0 255]
/WhitePoint [0.9505 1.0000 1.0891] def
/DecodeABC [{255 div 1.8008 exp}bind dup dup] def
/MatrixABC [0.4294 0.2332 0.0202 0.3278 0.6737 0.1105 0.1933 0.0938 0.9580]
def
/RangeLMN[0.0 0.9505 0.0 1.0000 0.0 1.0891]
>>
] setcolorspace
0 0 0 setcolor
```

FIG. 8

```
[/CIEBasedABC
<<
/RangeABC [0 0.9505 0 1 0 1.0890]
/RangeLMN[0 0.9505 0 1 0 1.0890]
/WhitePoint[0.9505 1 1.0890]
>>
] setcolorspace
0 0 0 setcolor
```

FIG. 11

```
/DeviceRGB setcolorspace
0 0 0 setcolor
```

FIG. 12

```
[/CIEBasedABC
<<
/RangeABC [0 1 0 1 0 1]
/WhitePoint [0.9505 1.0000 1.0891] def
/DecodeABC [{1.8008 exp}bind{1.8008 exp}bind{1.8008 exp}bind]def
/MatrixABC [0.4294 0.2332 0.0202 0.3278 0.6737 0.1105 0.1933 0.0938 0.9580]
def
/RangeLMN[0.0 0.9505 0.0 1.0000 0.0 1.0891]
>>
] setcolorspace
0 0 0 setcolor
```

F I G. 1 3

```
[/CIEBasedABC 20 dict
dup /CreationData (20030503000000)put
dup /RenderingIntent (RelativeColorimetric)put
dup /Description (FX RGB)put
dup /ColorSpace (RGB)put
dup /RangeABC[0 1 0 1 0 1]put
dup /DecodeABC[
{{0 0.00012 0.00024 0.00037 0.00049 0.00061 0.00073 0.00085 0.00098 0.0011
...
0.94918 0.95755 0.96596 0.97441 0.9829 0.99143 1}
dup 3-1 roll 0 1 3 copy 3-1 roll exch ge
{pop pop pop pop pop 256 get}
{pop 3 copy pop le{pop pop pop pop 0 get}
{exch dup 4-1 roll exch sub 3 1 roll sub div 256 mul dup
floor dup 3 1 roll sub exch cvi dup 1 add 4-1 roll exch
get 4-1 roll 3-1 roll get dup 4 1 roll sub mul add}
ifelse}ifelse
}bind
dup
dup
] put
dup /MatrixABC[
0.3048752575 0.1555580987 0.009735256
0.1026398108 0.3128404669 0.0304341192
0.0745937285 0.0316090639 0.3722896162
] put
dup /MatrixLMN[1.9999694824 0 0 0 1.9999694824 0 0 0 1.9999694824]put
dup /BlackPoint[0 0 0] put
dup /WhitePoint[0.9642028809 1 0.8249053955] put]setcolorspace
```

IMAGE PROCESSING APPARATUS AND IMAGE PROCESSING METHOD

BACKGROUND OF THE INVENTION

1. Field of the Invention

The present invention relates to an image processing apparatus and an image processing method and, more specifically, to an image processing apparatus and an image processing method which perform image processing for drawing information including image information and color correction information.

2. Description of the Related Art

In general, in a conventional image forming apparatus such as a printer apparatus which performs image formation on the basis of color image data input from an information processing apparatus such as various client computers, an image is formed by using color materials of cyan (C), magenta (M), yellow (Y), and black (K).

On the other hand, when a document is formed by the image processing apparatus, a display device such as a CRT display or a liquid crystal display is used. For this reason, a variety of image processing is performed with the information processing apparatus by using R (red), G (green), and B (blue) values which are color components displayed the display device. Color image data expressed by R, G, and B values obtained as a result of the image processing are frequently sent to the image forming apparatus.

In this case, in the image forming apparatus, after the R, G, and B values are converted into C, M, Y, and K values, image formation is performed by using the C, M, Y, and K values. However, achromatic characters or the like which actually should be printed with a monochromatic K-color material (image formation) are printed with a color mixture of the color materials of C, M, Y, and K. The characters or the like may then disadvantageously blur or fade.

To this problem, the following technique is known conventionally. That is, intermediate images described per each object by analyzing a color image input from a host computer are generated, and the intermediate images are converted into a YMCK image in which, the color is regarded as gray to set the components other than the K component are set to 0 (zero) when R value=G value=B value for intermediate color data images (for example, see Japanese Patent Application Laid-Open (JP-A) No. 9-27915).

To solve the above problem, the following technique is also known. That is, it is determined whether all R, G, and B values of each pixel of color image data in an RGB color space input from a host computer are 0 (zero). Pixels in which all the values are zero are determined to be a black character, and the pixels are formed with only black recording material (for example, see Japanese Patent Publication No. 3359070).

In recent years, the frequency of adding color correction information for color image data for display devices or the like has increased in operating systems and application programs of client computers (simply "applications" hereinafter). More specifically, in many cases, the frequency has increased of sending color image data with added color correction information independent on devices, not the R, G, and B values themselves, to an image forming apparatus.

In this case, when only comparison of color component values is performed as in the techniques disclosed in JP-A No. 9-27915 and Japanese Patent Publication No. 3359070, it is difficult to determine whether an image has an achromatic color to which a K color material of a single color must be applied. In these techniques, an erroneous determination is easily made. When an erroneous determination is made, image forming cannot be performed with accurate colors.

More specifically, when color image data to which color correction information is not added and to which an RGB color space is applied is input, it can be easily determined whether an image has an achromatic color (gray) by checking whether the condition R value=G value=B value is satisfied. However, when the color correction information is added, even though the condition: A value=B value=C value is satisfied where A, B, and C are input values of three-color components, an image does not always have achromatic color. In order to know the colors of the image, the color correction information must be referred to.

For example, for typical drawing information formed to include color correction information and color image data, the page description language PostScript is cited. In PostScript, a color space and values of respective color components are set before an object is drawn in order to perform color setting. For example, when a color component value (0, 0, 0) is designated in the RGB color space, a description as in the example shown in FIG. 11 is obtained.

When the color correction information is added, a description as in the example shown in FIG. 12 is obtained. The portion from '[/CIEBasedABC<<' as far as '>>]setcolorspace' is a region corresponding to the color correction information, which includes a large number of items such as define statements and parameters, and has a very complex structure. In addition, depending on the applications, as in the example shown in FIG. 13, a more complex description may be required, with description contents often varying with each application.

As a method of determining whether the color is to be replaced with a single color, i.e., black, with having referred to the color correction information when the color correction information is added, the following method is considered. That is, a large number of combinations of items of color correction information and color component values, by which achromatic color is set as a result, are stored as standard patterns in advance. Pattern matching between the standard patterns and input color image data with the color correction information is then performed to make the determination. However, this method can be used with only a few applications, limiting the scope of application.

The above problems arise not only when an applied color material is a single-color material K but also when another single-color material (one of color materials C, M, and Y) is employed.

SUMMARY OF THE INVENTION

The present invention has been made in consideration of the above problems and provides an image processing apparatus and an image processing method.

In order to address the above problem, an image processing apparatus according to the first aspect of the invention is an image processing apparatus that performs image processing for drawing information which includes image information and color correction information, and includes a first conversion component that converts a predetermined first color component value in a color space applied by the drawing information into a second color component value in a different color space while being corrected by the color correction, a decision component that determines whether the second color component value is a value falling within a predetermined range or not, and a second conversion component which performs conversion of color components used in image drawing based on the drawing information into a single color corresponding to the range.

According to the image processing apparatus described in the first aspect, the predetermined first color component value which is information to be subjected to image processing and which is in the color space applied by the drawing information which includes the image information and the color correction information is converted into the second color component value in the different color space while being corrected by the color correction information.

The color correction information may originally be included in the drawing information input to the image processing apparatus of the present invention, and color correction information can also be added to the drawing information which includes the input image information. Furthermore, the color space applied by the drawing information can include any color space such as an RGB color space, an L*a*b* color space, an HSB color space, an HIS color space, an HSL color space, an HSV color space, a YUV color space, a YIQ color space, or a YCbCr color space. In addition, a color space besides a color space, applied by the drawing information of any color space such as an L*a*b* color space, an HSB color space, an HIS color space, an HSL color space, an HSV color space, a YUV color space, a YIQ color space, or a YCbCr color space can be applied, as the different color space.

In the present invention, the decision component determines whether the second color component value obtained through conversion by the first conversion component is a value falling within the predetermined range or not. When it is determined that the second color component value falls within the range, conversion of a color component used in image drawing based on the drawing information into a single color corresponding to the range is performed by the second conversion component value. The "predetermined range" indicates the range of the second color component value in which color materials (for example, color materials of the colors C, M, Y, and K) used in image formation which uses the drawing information of the present invention are used as a single color advantageously in terms of the image quality of a formed image. The "predetermined range" is predetermined as a different range for each color material through computer simulation based on experiments using actual equipment, design specifications of actual equipment, and the like.

More specifically, in the present invention, a predetermined color component value in a color space applied by the drawing information is converted into a color component value in a different color space while being corrected by the color correction information included in the drawing information. The converted color component value, i.e., the color component value in which correction based on the color correction information is reflected, is used as a determining object to make it possible to more accurately determine whether a color material of a single color should be applied or not than if a determination were made without reflecting the color correction information in the determination.

In this manner, according to the image processing apparatus of the first aspect, the predetermined first color component value in the color space applied by the drawing information is converted into the second color component value in the different color space while being corrected by the color correction information, when image processing is performed for the drawing information which includes the image information and the color correction information. It is then determined whether the second color component value is a value falling within a predetermined range or not. When it is determined that the second color component value falls within the range, conversion of a color component used in image drawing based on the drawing information into a single color corresponding to the range is performed. For this reason, it can be accurately determined whether the color material of the single color should be applied or not. As a result, image formation can be performed with accurate colors.

An image processing method according to the second aspect of the invention is an image processing method which performs image processing for drawing information which includes image information and color correction information wherein a predetermined first color component value in a color space applied by the drawing information is converted into a second color component value in a different color space while being corrected by the color correction information. It is then determined whether the second color component value is a value falling within a predetermined range or not. When it is determined that the second color component value falls within the range, conversion of a color component used in image drawing based on the drawing information into a single color corresponding to the range is performed.

Therefore, according to the second aspect of the invention, since the image processing method operates, as in the first aspect of the invention, it can be accurately determined whether a color material of a single color should be applied or not as in the first aspect of the invention. As a result, image formation can be performed with accurate colors.

As described above, according to the image processing apparatus and the image processing method according to the present invention, when image processing is performed for drawing information which includes image information and color correction information, a predetermined first color component value in a color space applied by the drawing information is converted into a second color component value in a different space while being corrected by the color correction information. It is then decided whether the second color component value is a value falling within a predetermined range or not. When it is determined that the second color component value is a value falling within the range, conversion of a color component used in image drawing based on the drawing information into a single color corresponding to the range is performed. For this reason, it can be accurately determined whether a color material of a single color should be applied or not. As a result, image formation can be advantageously performed with accurate colors.

BRIEF DESCRIPTION OF THE DRAWINGS

Preferred embodiments of the present invention will be described in detail based on the following figures, wherein:

FIG. 5 is a diagram for explaining replacement of output profiles, and a schematic diagram showing a description of an output profile obtained with PostScript before a replacement;

FIG. 7 is a schematic diagram showing a description of minimum and maximum values of each color component value in a color space applied by drawing information;

FIG. 8 is a schematic diagram showing a description of minimum and maximum values of each color component value in a color space applied by drawing information;

FIG. 11 is a schematic diagram showing a description of a color component value obtained with PostScript;

FIG. 12 is a schematic diagram showing a description obtained with PostScript of drawing information with color correction information added; and FIG. 13 is a schematic diagram showing another description obtained with PostScript of drawing information with color correction information added.

DETAILED DESCRIPTION OF THE INVENTION

Preferred embodiments of the present invention will be described below in detail with reference to the drawings.

First Embodiment

Figure 1:
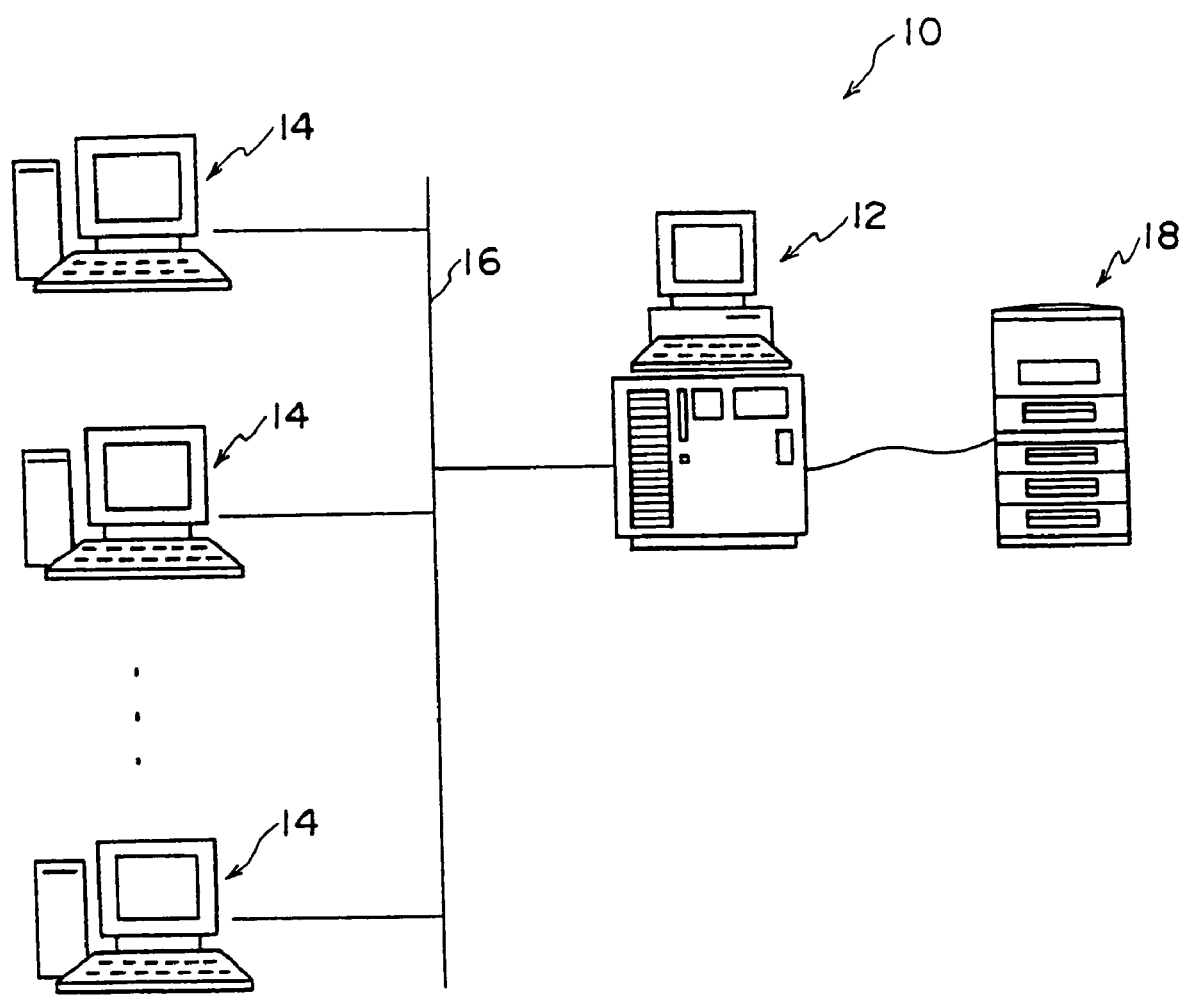
FIG. 1 is a schematic diagram of a network according to an embodiment of the invention.

FIG. 1 shows a schematic configuration of a network 10 applied to the embodiment. In the network 10, a print server 12 arranged as an image processing apparatus to which the present invention is applied and plural client terminals 14 arranged as information processing apparatuses are connected in a network through a communication line 16.

A printer 18 serving as an image forming apparatus is connected to the print server 12. When the print server 12 receives a print job output from the client terminals 14, the print server 12 executes a print output corresponding to the print job through the printer 18.

The following description will explain a case in which the image processing apparatus according to the present invention is applied as the print server 12. The image processing apparatus of the invention is not limited thereto, and any apparatus arranged at any of a variety of intermediate servers such as a file server connected to the client terminals 14 through network may be used. In addition, the image processing apparatus according to the present invention can also be incorporated in the printer 18. Not only the printer 18 but also a plate setter which directly exposes a photosensitive planographic printing plate or the like on the basis of image data to form a machine plate for printing, an exposure device which exposes an original film used in image printing (exposure) to a photosensitive planographic printing plate, or the like can be connected.

Figure 2:
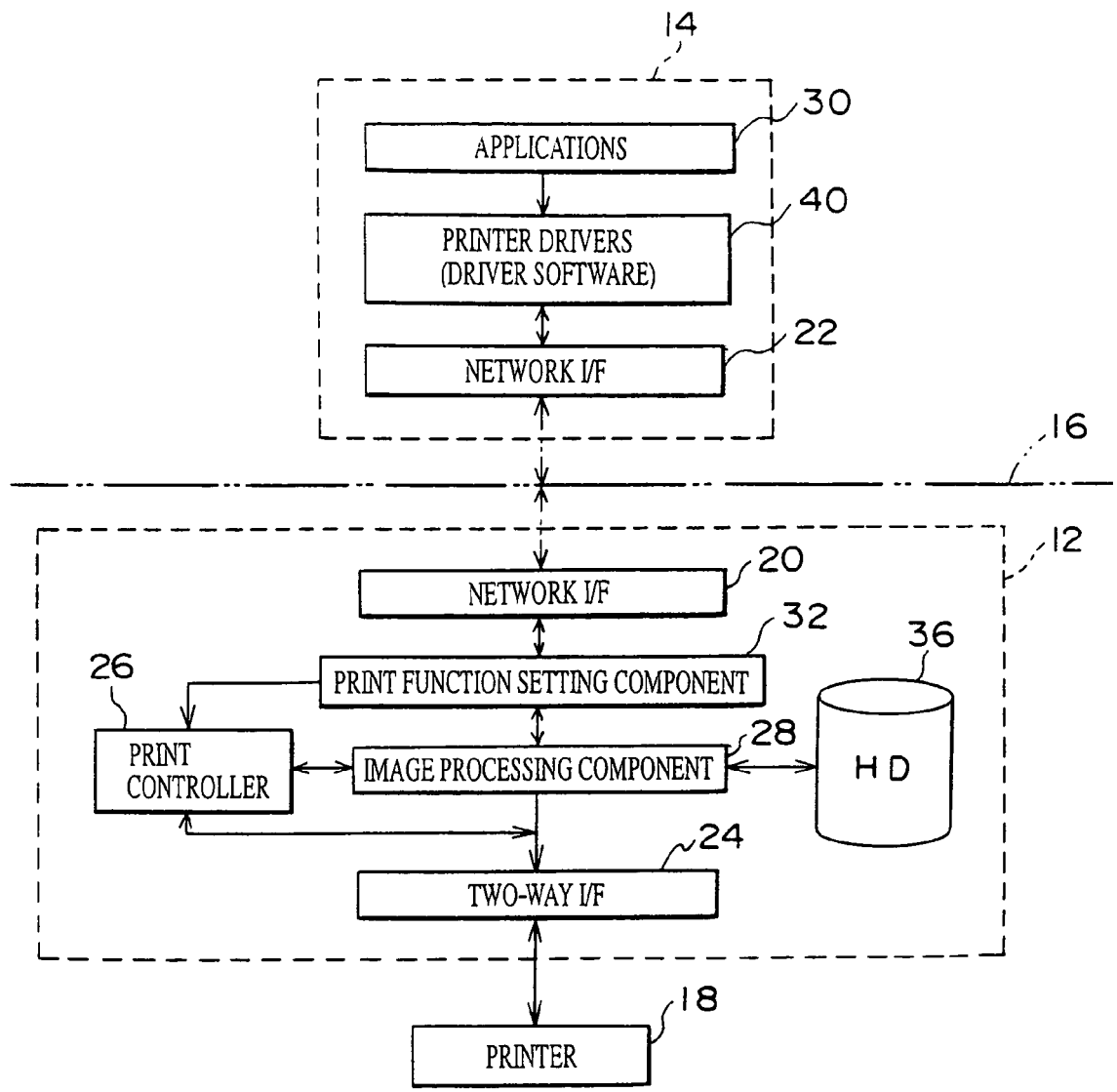
FIG. 2 is a block diagram showing a main schematic configuration of the main portions of a printer server and a client terminal according to an embodiment of the invention.

As shown in FIG. 2, network interfaces (network I/Fs) 20 and 22 are arranged in the printer server 12 and the client terminal 14. The print server 12 and the client terminal 14 are connected to the communication line 16 through the network I/Fs 20 and 22, respectively. The print server 12 includes a two-way interface (two-way I/F) 24 such as Ethernet, and is connected to the printer 18 through the two-way I/F 24. Plural printers 18 may be connected to the print server 12. Plural two-way I/Fs 24 may be used, and may be of several types.

A LAN (Local Area Network) connection such as Apple Talk or Ethernet (for example, Ethernet Talk or the like) may be applied, as a network connection between plural client terminals 14 and the print server 12. In addition, a WAN (Wide Area Network) connection may be applied. More specifically, a connection achieved with arbitrary network protocol can be applied.

The print server 12 as described above can be configured by adding a PCI board having a predefined function to a personal computer (PC). The print server 12 includes one or more input devices such as a keyboard or a mouse, a display device such as a CRT display or an LCD display, and other such equipment. The print server 12 may include a WYSIWYG function which performs processing for an image displayed on the display device and which prints out the displayed image.

A print controller 26 which controls the printer 18 and an image processing component 28 are arranged in the print server 12. The image processing component 28 performs RIP (Raster Image Processor) processing which generates raster data on the basis of job data such as drawing information input as a print job from the client terminals 14.

In the print server 12, input print jobs are stored in a queue for processing, the print jobs stored in the queue for processing being sequentially read to execute image processing (RIP processing). Data (raster data) output to the printer 18 after the image processing are stored in a queue for printing, and the data are sequentially output from the queue for printing to the printer 18. The print server 12 employs a general configuration in which a job which does not designate a print process or cannot execute a print process is stored and held in a holding queue. The print server 12 can use various conventionally known configurations, and in the embodiment, a detailed description will be omitted.

The client terminals 14 include various applications 30 and perform image processing, document formation, and the like including formation, processing, and editing of images and documents by using the applications 30 so that drawing information can be formed. The client terminals 14 can transmit the formed drawing information and various processing designations to the print server 12 as print jobs.

When the print server 12 receives a print job, the print server 12 performs designated image processing for the print job and outputs to the printer 18 so that a printed matter corresponding to the print job can be obtained.

A print function setting component 32 is arranged in the print server 12. When the print server 12 receives a print job or the like, the print function setting component 32 sets various print functions designated by the print job. Conventionally known print functions can be set in the print server 12. Print functions designated by the print job are determined and set in the print function setting component 32 such that the print functions are executed by the image processing component 28 and the print controller 26. However, a detailed description thereof will be omitted in this embodiment.

Driver software 40 (printer drivers) to set various print functions arranged in the print server 12 is incorporated in each of the client terminals 14. In the client terminals 14, when there is a request for a print process or the like for drawing information formed by the application 30, the driver software 40 is used for various print functions arranged in the print server 12 can be set.

In the drawing information formed by the client terminals 14 according to the embodiment, information (corresponding to "color correction information" of the invention) representing an input profile as in the example shown in FIG. 12 is described with PostScript.

In the printer 18 according to the embodiment, an output profile called a CRD (Color Rendering Dictionary) described with PostScript by using parameters, define statements, and the like corresponding to the image formation characteristics of the printer 18 is stored in memory.

Figure 3:
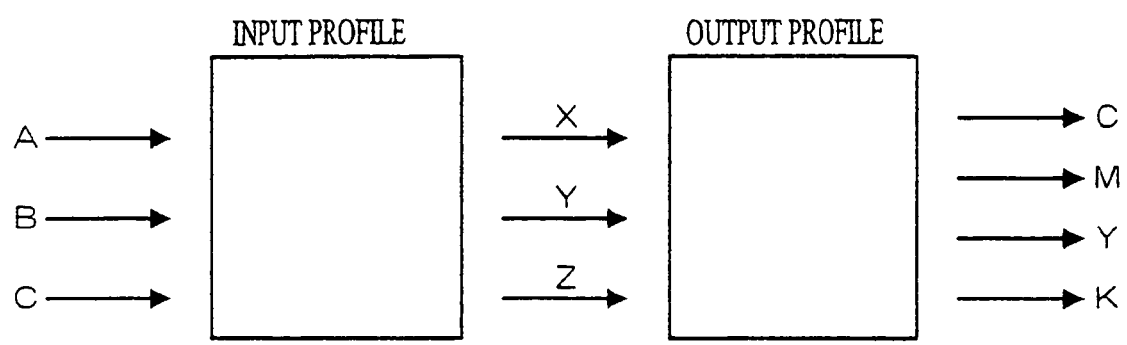
FIG. 3 is a block diagram showing forms of usage of an input profile and an output profile according to an embodiment of the invention.

In the print server 12 according to the embodiment, as typically shown in FIG. 3, the image processing component 28 converts the image information (three input color component values A, B, and C in FIG. 3) included in the drawing information into color component values C, M, Y, and K corresponding to the image formation characteristics of the printer 18 by using various items of profile information for the input profile input from the client terminals 14 and an output profile stored in the printer 18. FIG. 3 shows the following case. That is, the three input profile color component values are temporarily converted into X, Y, and Z which are color component values in an XYZ color space, and the color component values X, Y, and Z are converted into the color component values C, M, Y, and K in the output profile.

Furthermore, in the print server 12, with a single-color decision process (to be described later) executed by the image processing component 28, the input profile and the output profile are used to determine whether an object to be printed is to be formed as an image with a color material of a single color such as C, M, Y, or K or not. When it is determined that image formation is to be performed with a color material of a single color, the output profile is set and the image formation is realized.

Figure 4:
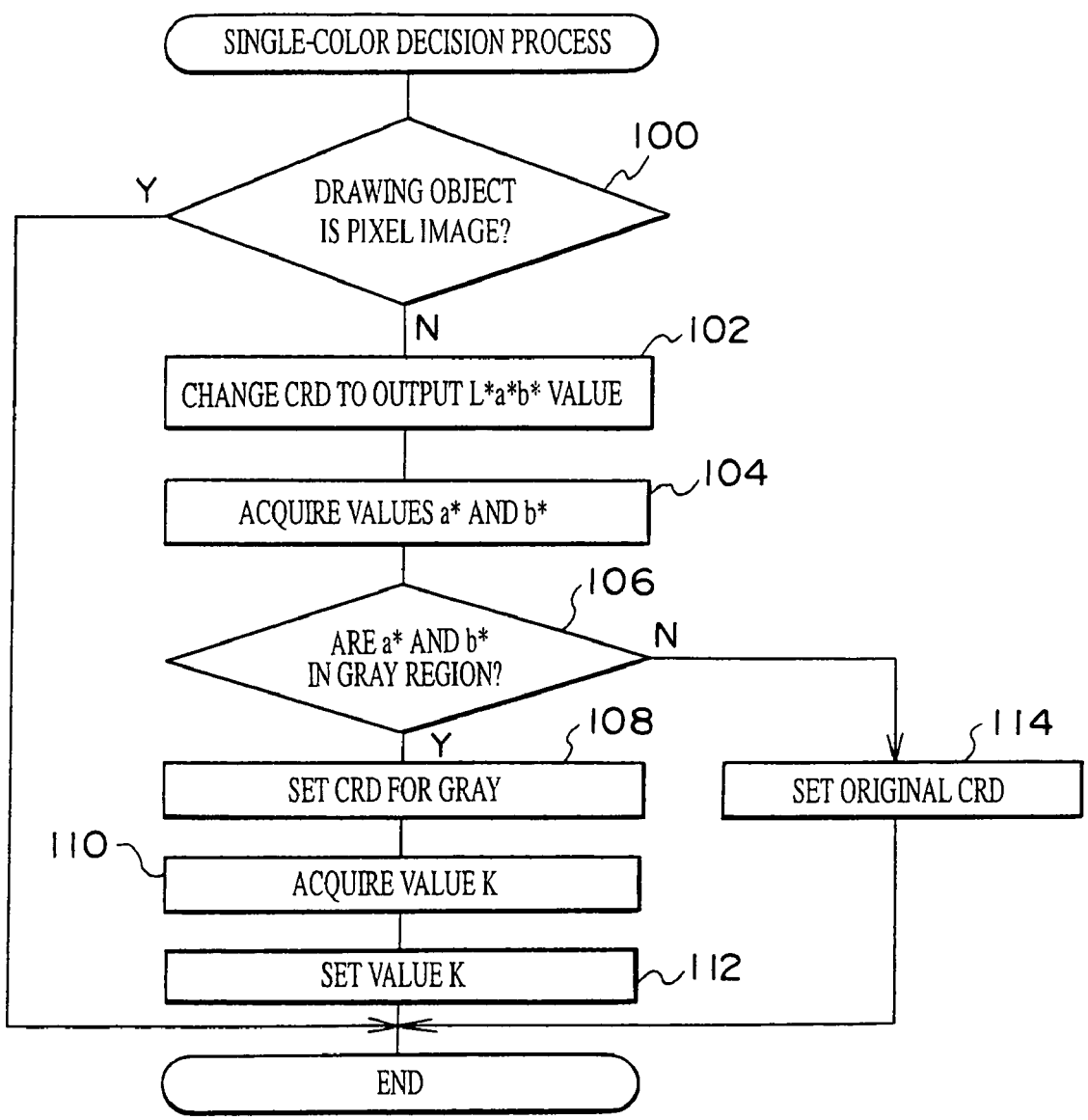
FIG. 4 is a flow chart showing a flow of processes in a single-color decision process program according to a first embodiment of the invention.

A single-color decision process executed in the image processing component 28 of the print server 12 according to the invention will be described below with reference to FIG. 4. FIG. 4 is a flow chart showing a flow of processes in a single-color decision process program which is executed in the image processing component 28 each time a command (hereinafter "print execution designation command") which designates execution of printing in units of objects included in drawing information input as a print job from any one of the client terminals 14. The program is previously stored on a hard disk 36 arranged in the image processing component 28. The single-color decision process is performed by using color materials C, M, Y, and K as objects to be processed. To avoid confusion, a case in which only the color material K is used as an object to be processed will be described below.

At step 100, type information representing the type of object to be printed is acquired on the basis of the type of print execution designation command to determine whether the type is a pixel image or not. When the determination at step 100 is affirmative, the single-color decision process is ended without performing the subsequent processes. When the determination at step 100 is negative, the process continues to step 102.

At step 102, the output profile (CRD) is changed to output a value in an $L^*a^*b^*$ color space. In this case, the change is performed such that the region to output color component values C, M, Y, and K of the output profile is replaced with a region which outputs values in the $L^*a^*b^*$ color space.

For example, when an output profile shown in FIG. 5 is prepared as an example at the printer 18, the region following '/RenderTable[' of the output profile corresponds to a region to output the color component values C, M, Y, and K. However, the region is replaced with a profile which outputs values in the $L^*a^*b^*$ color space as in the example shown in FIG. 6.

In the output profile shown in FIG. 5, the region before the '/RenderTable[' is a region which prepares to derive values in the $L^*a^*b^*$ color space. Thus, the region which outputs the values in $L^*a^*b^*$ color space can be simply realized in a relatively simple manner.

At the next step 104, by using the input profile included in the drawing information input from the client terminals 14 and an output profile partially replaced by the above process, input color component values ('0, 0, 0' described immediately before 'setcolor' in the example shown in FIG. 12) included in the input profile are converted into values in the $L^*a^*b^*$ color space. Of these values, the values a* and b* representing sensory chromaticities are acquired.

At the next step 106, it is determined whether the values a* and b* are located in a gray region or not. When the determination at step 106 is affirmative, it is determined that image formation for an object to be printed should be performed with a color material of a single color K, and the process continues to step 108.

More specifically, in the decision at step 106, when the maximum and minimum values of a value L* representing a brightness index are 0 (zero) and 100 ($0 \leq L^* \leq 100$), respectively, and when the minimum and maximum values of each of the values a* and b* are −128 and 127 ($-128 \leq a^* \leq -127$ and $-128 \leq b^* \leq 127$), respectively, it is determined that the values a* and b* are located in the gray region when both the values a* and b* are from −3 to 2 ($-3 \leq a^* \leq 2$ and $-3 \leq b^* \leq 2$). Both the values a* and b* should normally be 0 ($a^*=b^*=0$) when gray is set, however, in the embodiment, consideration is given to slight errors. The values are not limited to specific numerical ranges, and for example, the numerical ranges are designed to be changeable, and can be appropriately changed depending on image quality or the like as required by printed matter.

At step 108, the output profile is set for gray such that the output profile is changed to derive only a value of K. At step 110, by using the input profile included in the drawing information input from the client terminal 14 and the output profile for gray obtained by the process at step 108, input color component values included in the input profile are converted into color component values of K to acquire the color component values. At step 112, a color space is changed such that printing is performed with only the color material of the single color K and a concentration represented by the color component values on the basis of the acquired color component values of K. Thereafter, the single-color decision process is ended.

On the other hand, when the determination at step 106 is negative, it is determined that image formation for an object to be printed should not be performed with the color material of the single color K, and the process continues to step 114 to return the output profile to the original output profile. Thereafter, the single-color decision process is ended.

The process at step 100 of the single-color decision process program corresponds to the acquisition component and the switching component of the present invention, the processes from steps 102 to 104 correspond to the first conversion component of the present invention, the process at step 106 corresponds to the decision component of the present invention, and the processes from step 108 to step 112 correspond to the second conversion component of the present invention.

The print process is continuously executed by using the input profile and the output profile obtained by the single-color decision process, so that image formation for an object to be printed should be performed with the color material of the single color K. In this case, the object is printed with the color material of the single color K. In the other cases, the object is printed by using color materials of plural colors.

As described above, in the embodiment, when image processing is performed for the drawing information which includes the image information and the color correction information, predetermined first color component values (input color component values in the embodiment) in a color space applied by the drawing information are converted into second color component values (values a*, b* in the embodiment) in a different color space ($L^*a^*b^*$ color space in the embodiment) while being corrected by the color correction information, and it is determined whether the second color component values fall within a predetermined range or not. When it is determined that the values fall within the predetermined range, conversion of a color component used in image drawing based on the drawing information into a single color corresponding to the range is performed. For this reason, it can be accurately determined whether a color material of a single color should be applied or not. As a result, image formation can be performed with accurate colors.

Second Embodiment

In the second embodiment, the following configuration will be described. That is, the minimum and maximum values of each color component value in a color space applied by drawing information input from client terminals 14 are used to more accurately determine whether image formation for an object to be printed should be performed with a color material of a single color.

The minimum and maximum values are generally described in an input profile.

For example, in the input profile shown in FIG. 12, a numerical group ([0 1 0 1 0 1]) in parentheses immediately after '/RangeABC' corresponds to the maximum and minimum values. In this case, FIG. 12 shows that the minimum and maximum values of the three-color component values are '0' and '1', respectively. Similarly, an example shown in FIG. 7 shows that the minimum and maximum values of the three-color component values are '0' and '255', respectively. An example shown in FIG. 8 shows that the minimum and maximum values of the first color component value are '0' and '0.9505', the minimum and maximum values of the second color component value are '0' and '1', and the minimum and maximum values of the third color component value are '0' and '1.0890'.

The second embodiment will be explained in a case in which the minimum and maximum values described in the input profile are used. Since a system configuration according to the second embodiment and the configurations of apparatuses are the same as those in the first embodiment (see FIGS. 1 and 2), a description thereof will be omitted.

Figure 9:
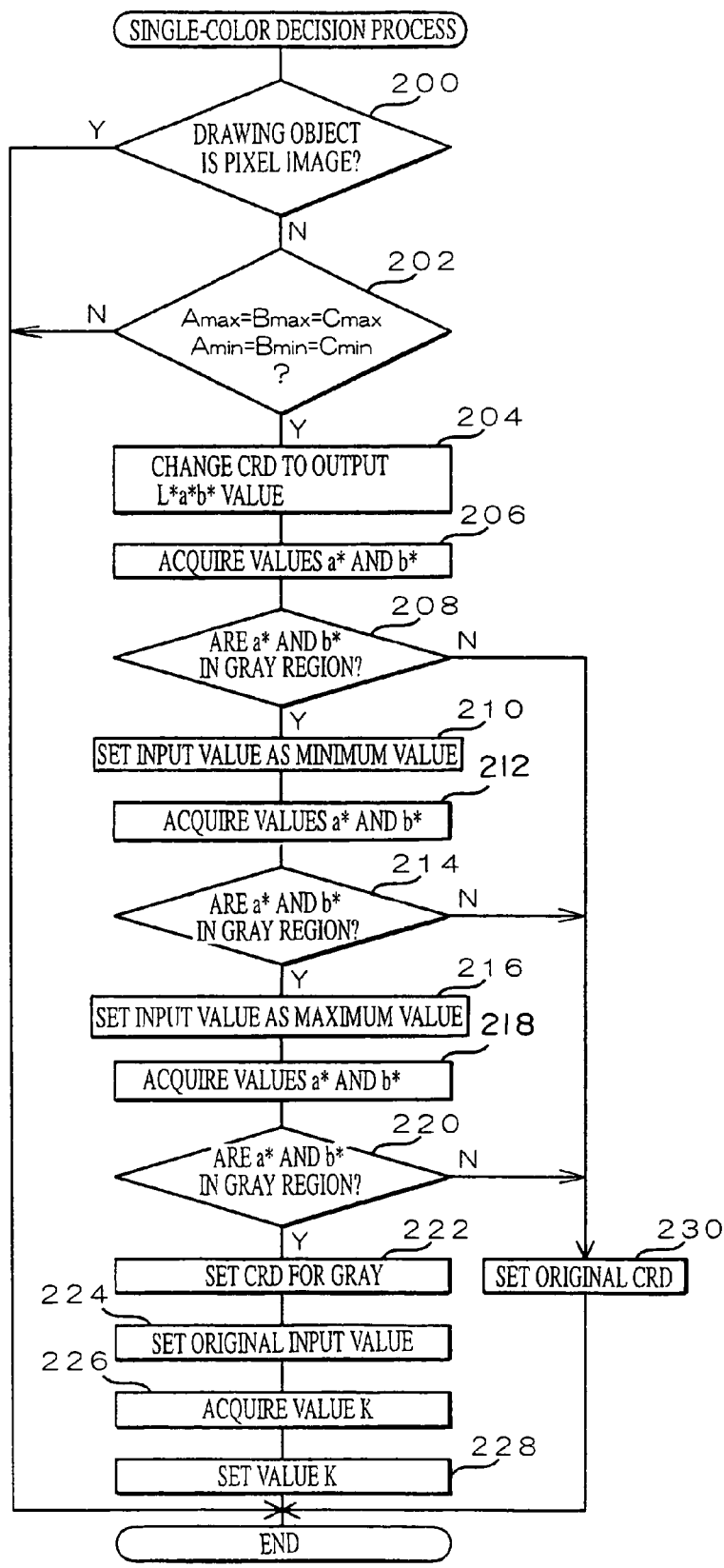
FIG. 9 is a flow chart showing a flow of processes in a single-color decision process program according to a second embodiment of the invention.

A single-color decision process executed in an image processing component 28 of a print server 12 according to the second embodiment will be described below with reference to FIG. 9. FIG. 9 is a flow chart showing a flow of processes in a single-color decision process program executed in the image processing component 28 each time drawing information is input as a print job from any one of the client terminals 14 to execute a print execution designation command included in the drawing information. The program is stored on a hard disk 36 arranged in the image processing component 28 in advance. The single-color decision process is performed by using color materials C, M, Y, and K as objects to be processed. To avoid confusion, a case in which only the color material K is used as an object to be processed will describe below.

At step 200, type information representing the type of object to be printed is acquired on the basis of the type of print execution designation command to determine whether the type is a pixel image or not. When the determination at step 200 is affirmative, the single-color decision process is ended without performing the subsequent processes. When the determination at step 200 is negative, the process continues to step 202.

At step 202, it is determined whether all the minimum values of the color component values described in the input profile are equal or not and all the maximum values of the color component values are equal or not. In the following description, the minimum and maximum values of the first color component value are represented by Amin and Amax, respectively, the minimum and maximum values of the second color component value are represented by Bmin and Bmax, respectively, and the minimum and maximum values of the third color component value are represented by Cmin and Cmax, respectively. Therefore, at step 202, it is determined whether Amin=Bmin=Cmin and Amax=Bmax=Cmax.

When the determination at step 202 is negative, the ranges of all the color component values are not equal to each other, and it is determined that a process for determining whether image formation should be performed with a color material of a single color is not easily performed with high accuracy and the single-color decision process is ended without performing the subsequent processes. In this manner, an error in the above determination can be prevented, and calculation load for the determination can be reduced.

On the other hand, the determination at step 202 is affirmative, the process continues to step 204, and an output profile (CRD) is changed to output values in the L*a*b* color space. In this case, the change is performed in the same manner as the process at step 102 of the single-color decision process program according to the first embodiment such that a region to output color component values C, M, Y, and K of the output profile is replaced with a region to output values in the L*a*b* color space.

At the next step 206, by using the input profile included in the drawing information input from the client terminal 14 and an output profile partially replaced by the process in step 204, input color component values included in the input profile are converted into values in the L*a*b* color space. Of these values, the values a* and b* representing sensory chromaticities are acquired.

At the next step 208, it is determined whether the values a* and b* are located in a gray region or not as in the process at step 106 of the single-color decision process program according to the first embodiment. When the determination at step 208 is affirmative, the process continues to step 210.

At step 210, the three input color component values included in the input profile are converted into the corresponding minimum values Amin, Bmin, and Cmin, respectively. At step 212, by using the input profile and the output profile partially replaced by the process at step 204, the minimum values of the input color component values set in the input profile by the process at step 210 are converted into values in the L*a*b* color space. Of these values, the values a* and b* representing sensory chromaticities are acquired.

At the next step 214, it is determined whether the acquired values a* and b* are located in a gray region or not as in the process at step 106 of the single-color decision process program according to the first embodiment. When the determination at step 214 is affirmative, the process continues to step 216.

At step 216, the three input color component values included in the input profile are converted into the corresponding maximum values Amax, Bmax, and Cmax, respectively. At step 218, by using the input profile and the output profile partially replaced by the process at step 204, the maximum values of the input color component values set in the input profile by the process at step 216 are converted into values in the L*a*b* color space. Of these values, the values a* and b* representing sensory chromaticities are acquired.

At the next step 220, it is determined whether the acquired values a* and b* are located in a gray region or not as in the process at step 106 of the single-color decision process program according to the first embodiment. When the determination at step 220 is affirmative, it is determined that image formation for an object to be printed should be performed with the color material of the single color K, and the process continues to step 222.

At step 222, the output profile is set for gray such that the output profile is changed to derive only a value of K. At the next step 224, the three input color component values included in the input profile are returned to the values set when the three input color component values are input from the client terminals 14.

At the next step 226, by using the input profile and the output profile for gray obtained by the process at step 222, input color component values included in the input profile are converted into color component values of K to acquire the color component values. At the next step 228, on the basis of the acquired color component values of K, a color space is changed such that printing is performed with only the color material of the single color K and a concentration represented by the color component values. Thereafter, the single-color decision process is ended.

On the other hand, when the determination at one of step 208, step 214, and step 220 is negative, it is determined that image formation for an object to be printed should not be performed with the color material of the single color K, and the process continues to step 230 to return the output profile to the original output profile. Thereafter, the single-color decision process is ended.

The process at step 200 of the single-color decision process program corresponds to the acquisition component and the switching component of the invention, the processes from steps 204 to 206 correspond to the first conversion component of the invention, the process at step 208 corresponds to the decision component of the invention, and the processes from step 222 to step 228 correspond to the second conversion component of the invention.

The print process is continuously executed by using the input profile and the output profile obtained by the single-color decision process, so that when image formation for an object to be printed should be performed with the color material of the single color K, the object is printed with the color material of the single color K. In other cases, the object is printed by using color materials of a plurality of colors.

As specifically described above, in the embodiment, when image processing is performed for the drawing information which includes the image information and the color correction information, predetermined first color component values (input color component values in the embodiment) in a color space applied by the drawing information are converted into second color component values (values a*, b* in the embodiment) in a different color space (L*a*b* color space in the embodiment) while being corrected by the color correction information, and it is determined whether the second color component values fall within a predetermined range or not. When it is determined that the values fall within the predetermined range, conversion of a color component used in image drawing based on the drawing information into a single color corresponding to the range is performed. For this reason, it can be accurately determined whether a color material of a single color should be applied. As a result, image formation can be performed with accurate colors.

Furthermore, in the embodiment, in addition to the input color component values, the minimum and maximum values of the color component values in the color space applied by the drawing information are used to determine whether a color material of a single color should be applied or not. For this reason, the determination can be performed with higher accuracy.

Third Embodiment

In general, in the drawing information input from the client terminal 14 to the print server 12, an RGB color space is frequently applied. In this case, when the minimum values Amin, Bmin, and Cmin of color component values described in an input profile included in the drawing information are also located in a gray region, and when the maximum values Amax, Bmax, and Cmax are located in the gray region, it is highly probable that the input color component values are located in the gray region when the input color component values are equal to each other.

With attention to this, in the third embodiment, the following configuration will be described. That is, the minimum and maximum values of the color component values in the color space applied by the drawing information input from the client terminal 14 are used to accurately determine whether image formation for an object to be printed should be performed with a color material of a single color or not. Also in the third embodiment, as in the second embodiment, a case in which the minimum values and the maximum values described in the input profile are used will be described. Since a system configuration and the configurations of apparatuses according to the third embodiment are the same as those in the first embodiment (see FIGS. 1 and 2), a description thereof will be omitted.

Figure 10:
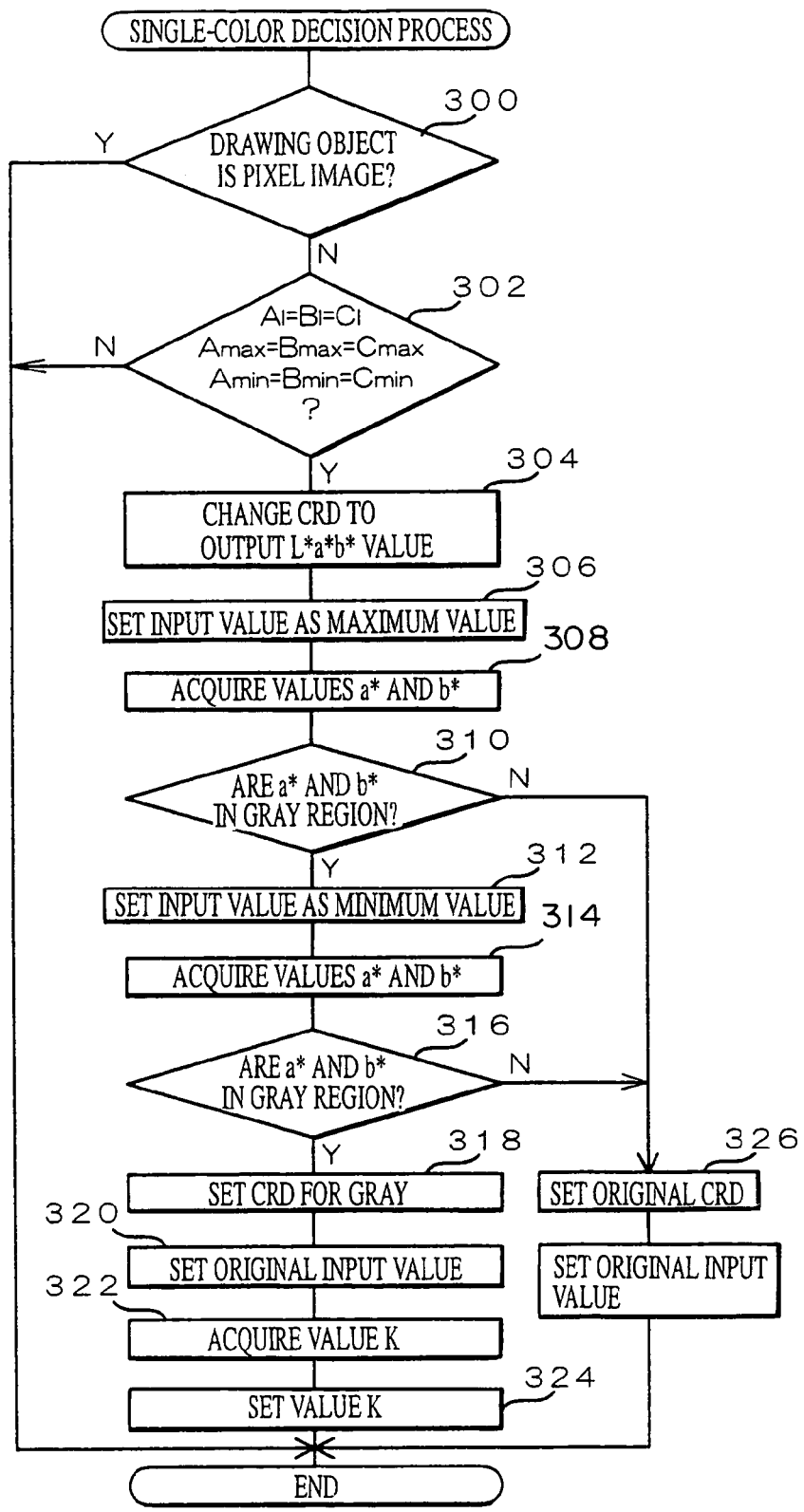
FIG. 10 is a flow chart showing a flow of processes in a single-color decision process program according to a third embodiment of the invention.

A single-color decision process executed in an image processing component 28 of a print server 12 according to the third embodiment will be described below with reference to FIG. 10. FIG. 10 is a flow chart showing a flow of processes in a single-color decision process program executed in the image processing component 28 each time drawing information is input as a print job from any one of client terminals 14 to execute a print execution designation command included in the drawing information. The program is stored on a hard disk 36 arranged in the image processing component 28 in advance. The single-color decision process is performed by using color materials C, M, Y, and K as objects to be processed. To avoid confusion, a case in which only the color material K is used as an object to be processed will described below.

First, at step 300, type information representing the type of object to be printed is acquired based on the type of print execution designation command to determine whether the type is a pixel image. When the determination at step 300 is affirmative, the single-color decision process is ended without performing the subsequent processes. When the determination at step 300 is negative, the process continues to step 302.

At step 302, it is determined whether the input color component values described in the input profile are equal to each other and whether Amin=Bmin=Cmin and Amax=Bmax=Cmax.

When the determination is negative at step 302 is negative, it is determined that the input drawing information does not target an RGB color space, and the single-color decision process is ended without performing the subsequent processes. In this manner, an error in the above determination can be prevented, and calculation load for the determination can be reduced.

On the other hand, the determination at step 302 is affirmative, the process continues to step 304, and an output profile (CRD) is changed to output values in the L*a*b* color space. In this case, the change is performed similarly to the process in step 102 of the single-color decision process program according to the first embodiment such that a region to output color component values C, M, Y, and K of the output profile is replaced with a region to output values in the L*a*b* color space.

At the next step 306, the three input color component values included in the input profile are changed into the corresponding maximum values Amax, Bmax, and Cmax, respectively. At the next step 308, by using the input profile and an output profile partially replaced by the process in step 304, the maximum values of the input color component values set in the input profile by the process at step 306 are converted into values in the L*a*b* color space. Of these values, the values a* and b* representing sensory chromaticities are acquired.

At the next step 310, it is determined whether the acquired values a* and b* are located in a gray region or not as in the process at step 106 of the single-color decision process program according to the first embodiment. When the determination at step 310 is affirmative, the process continues to step 312.

At step 312, the three input color component values included in the input profile are converted into the corresponding minimum values Amin, Bmin, and Cmin, respectively. At step 314, by using the input profile and the output profile partially replaced by the process in step 304, the minimum values of the input color component values set in the input profile by the process at step 312 are converted into values in the L*a*b* color space. Of these values, the values a* and b* representing sensory chromaticities are acquired.

At the next step 316, it is determined whether the obtained values a* and b* are located in a gray region or not as in the process at step 106 of the single-color decision process program according to the first embodiment. When the determination at step 316 is affirmative, it is determined that image formation for an object to be printed should be performed with a color material of a single color K, the process continues to step 318.

At step 318, the output profile is set for gray such that the output profile is changed to derive only a value of K. At the next step 320, the three input color component values included in the input profile are returned to the values set when the three input color component values are input from the client terminals 14.

At the next step 322, by using the input profile and the output profile for gray obtained by the process at step 318, input color component values included in the input profile are converted into color component values of K to acquire the color component values. At the next step 324, on the basis of the acquired color component values of K, a color space is changed such that printing is performed with only the color material of the single color K and a concentration represented by the color component values. Thereafter, the single-color decision process is ended.

On the other hand, when the determination at one of step 310 and step 316 is negative, it is determined that image formation for an object to be printed should not be performed with the color material of the single color K, and the process continues to step 326. At step 326, the output profile is returned to the original output profile. Thereafter, at the next step 328, the three input color component values included in the input profile are returned to the values set when the three input color component values are input from the client terminals 14. Thereafter, the single-color decision process is ended.

The process at step 300 of the single-color decision process program corresponds to the acquisition component and the switching component of the present invention, the processes from steps 304 to 308 and 312 to 314 correspond to the first conversion component of the present invention, the processes at steps 310 and 316 correspond to the decision component of the present invention, and the processes from step 318 to step 324 correspond to the second conversion component of the present invention.

The print process is continuously executed by using the input profile and the output profile obtained by the single-color decision process, so that when image formation for an object to be printed should be performed with the color material of the single color K, the object is printed with the color material of the single color K. In other cases, the object is printed by using color materials of plural colors.

As specifically described above, in the embodiment, when image processing is performed for the drawing information which includes the image information and the color correction information, predetermined first color component values (minimum and maximum values of input color component values in the embodiment) in a color space applied by the drawing information are converted into second color component values (values a* and b* in the embodiment) in a different color space (L*a*b* color space in the embodiment) while being corrected by the color correction information, and it is determined whether the second color component values fall within a predetermined range or not. When it is determined that the values fall within the predetermined range, conversion of a color component used in image drawing based on the drawing information into a single color corresponding to the range is performed. For this reason, it can be accurately determined whether a color material of a single color should be applied or not. As a result, image formation can be performed with accurate colors.

On the other hand, in the above embodiments, as the drawing information, information including profile information representing a conversion profile (input profile in the embodiment) to convert color component values in an applied color space into color component values in a predetermined color space is applied. For this reason, the drawing information of this type has been widely applied recently in the field of image forming apparatuses. Therefore, versatility can be improved.

Figure 6:
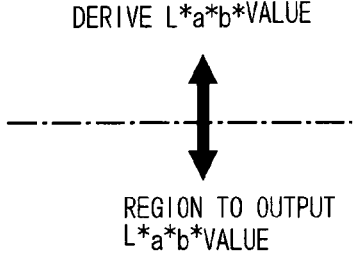
FIG. 6 is a diagram for explaining replacement of output profiles, and a schematic diagram showing a description of an output profile obtained with PostScript after a replacement.

In the above embodiments, a combination of profile information representing the conversion profile and profile information (profile which outputs values in the L*a*b* color space shown in FIG. 6 in the embodiment) to convert color component values into the second color component values in the different color space is used to perform conversion to the second color component values. For this reason, conversion to the second color component values can be easily performed.

In the above embodiments, a combination of profile information representing the conversion profile and profile information (profile for gray in the embodiment) which performs the conversion for single color is used to perform conversion for single color. For this reason, the conversion for single color can be easily performed.

In the above embodiments, the L*a*b* color space which has been widely applied recently in the field of image forming apparatuses is used as the different color space. For this reason, versatility can be improved.

In the above embodiments, type information representing the type of image (object) represented by the drawing information is acquired, and execution and non-execution of conversion performed by the first conversion component and conversion performed by the second conversion component corresponding to the type of image represented by the type information are switched with each other. For this reason, execution/nonexecution of a determination about whether image formation should be performed with a color material of a single color can be switched for each of type of image.

In particular, in the above embodiments, the switching is performed such that the conversion is executed when the type of image is other than a pixel image. For this reason, the switching is advantageous in terms of image quality. More specifically, when an image to be printed is a pixel image showing, for example, a person's hair, an image printed with color materials of plural colors is visually closer to a real image than an image printed with a color material of a single color K. Therefore, when a pixel image is an object to be printed, it is advantageous in terms of image quality that printing not be performed with a single color.

In the third embodiment, as the first color components of the invention, both the minimum and maximum values of the input color component values are applied. However, the present invention is not limited thereto. For example, any one of the minimum and maximum values can be applied. A single-color decision process program used in this case is provided such that the processes from steps 306 to 310 or the processes from steps 312 to 316 are omitted from the single-decision process program shown in FIG. 10 as an example. In this case, although the single-color decision process program is inferior to that of the embodiment, an advantage of being able to improve the accuracy of a determination about whether image formation should be performed with a color material of a single color or not can be obtained to some extent.

In the embodiments, instances are discussed where an output profile is designed to output color component values in a different color space by the output profile being partially replaced. However, the present invention is not limited thereto, and the output profile may be entirely replaced. In addition, a special command that stores color component values in the middle of conversion of color spaces in the output profile as variables can be added to output color component values in a different color space.

For example, in the PostScript language processing system, a CRD includes a portion in which a program for executing calculation can be described. For this reason, the command that stores the color component values as variables can be added to the portion, so that values converted by using added color correction information as an input profile can be referred to. In this case also, the same effects as those of the above embodiments can be achieved.

In the above embodiments, instances are discussed where the L*a*b* color space is applied as a "different color space" of the present invention. However, the invention is not limited to the L*a*b* color space. For example, an XYZ color space which has been widely used recently in the field of image forming apparatuses in the same manner as the L*a*b* color space can be applied. In this case also, the same effects as those of the embodiments can be achieved.

As the "different color space" of the present invention, for example, an HSB color space or a YIQ color space can also be applied.

When an HSB color space is applied as the "different color space" of the present invention, a determination about whether values are located in a gray region or not is performed as per the following example.

For example, it is assumed that the minimum and maximum values of H are 0 (zero) and 360 ($0 \leq H \leq 360$), respectively, and that the respective minimum values and the maximum values of S and B are 0 and 100 ($0 \leq S \leq 100$ and $0 \leq B \leq 100$). In this case, when the value of one of S and B is from 0 to 1 ($0 \leq S \leq 1$ or $0 \leq B \leq 1$), it is determined that the values are located in the gray region.

When a YIQ color space is applied as the "different color space" of the present invention, a determination about whether values are located in a gray region or not is performed as per the following example.

For example, assuming that the minimum and maximum values of Y are 0 (zero) and 1($0 \leq Y \leq 1$), respectively, that the minimum and maximum values of I are −0.596 and 0.596 ($-0.596 \leq I \leq 0.596$), respectively, that the minimum and maximum values of Q are −0.523 and 0.523 ($-0.523 \leq H \leq 0.523$), respectively, and that the value of Y is from 0 to 0.03 ($0 \leq H \leq 0.03$), the value of I is from 0 to 0.03 and the value of Q is from 0 to 0.03 ($0 \leq I \leq 0.03$ and $0 \leq Q \leq 0.03$), then, it is determined that the values are located in a gray region.

In these cases, the same effects as those in the embodiments can be achieved.

In the above embodiments, instances are discussed where color component values of a single color are acquired by using an input profile included in drawing information. However, the invention is not limited thereto. For example, conversion to the color component values of the single color can be performed with only an input color component without using an input profile.

The flows of processes of the single-color decision process program explained in the above embodiments (see FIGS. 4, 9, and 10) are only examples, and can be appropriately changed without departing from the spirit and scope of the present invention.

The system configuration and the configurations of the apparatuses explained in the above embodiments (see FIGS. 1 and 2) also are only examples, and can be appropriately changed without departing from the spirit and scope of the present invention.

As described above, the image processing apparatus according to the present invention is an image processing apparatus which performs image processing for drawing information which includes image information and color correction information, and includes a first conversion component which converts a predetermined first color component value in a color space applied by the drawing information into a second color component value in a different color space while being corrected by the color correction information, a decision component which determines whether the second color component value falls within a predetermined range or not, and a second conversion component which performs conversion of color components used in image drawing based on the drawing information into a single color corresponding to the range.

In the present invention, the first color component value may be a color component value of an image drawn by the drawing information or at least one of the maximum and minimum values in a color space applied by the drawing information.

In the present invention, the drawing information may include profile information representing a conversion profile to convert the color component value in the applied color space into a color component value in a predetermined color space.

In particular, the first conversion component preferably uses a combination of profile information representing the conversion profile and profile information to convert the first color component value into the second color component value in the different color space to perform conversion to the second color component value.

The second conversion component preferably uses a combination of profile information representing the conversion profile and profile information which performs the conversion for single color to perform the conversion for single color.

In the present invention, the L*a*b* color space or the XYZ color space is preferably used as the different color space in terms of versatility.

The image processing apparatus of the invention preferably further includes an acquisition component which acquires type information representing the type of image represented by the drawing information, and a switching component which switches execution and nonexecution of conversion performed by the first conversion component and conversion performed by the second conversion component corresponding to the type information acquired by the acquisition component. The types of images include character images, graphic images, and pixel images (photographic images or the like).

In particular, it is preferable in terms of image quality of an image to be formed that the switching component performs switching to execute the conversion when the type of image is other than a pixel image.

What is claimed is:

1. An image processing apparatus which performs image processing for drawing information which includes image information and color correction information, comprising:
   a first conversion component that converts predetermined first color component values in a color space applied by the drawing information into second color component values in a different color space while being corrected by the color correction information;
   a decision component that determines whether the second color component values fall within a predetermined multi-value range; and
   a second conversion component that performs conversion of the second color component values into a single color corresponding to the range, when the decision component determines the second color component values to be within the range.

2. The image processing apparatus according to claim 1, wherein the first color component values include a color component value of an image drawn by the drawing information, or at least one of the maximum and minimum values in a color space applied by the drawing information.

3. The image processing apparatus according to claim 1, wherein the drawing information includes profile information representing a conversion profile to convert the color component values in the applied color space into color component values in a predetermined color space.

4. The image processing apparatus according to claim 3, wherein the first conversion component uses a combination of the profile information representing the conversion profile and profile information of conversion into the second color component values in the different color space, to convert the first color component values into the second color component values.

5. The image processing apparatus according to claim 3, wherein the second conversion component uses a combination of the profile information representing the conversion profile and profile information which performs the conversion to single color to perform the conversion to single color.

6. The image processing apparatus according to claim 1, wherein one of an L*a*b* color space and an XYZ color space is used as the different color space.

7. The image processing apparatus according to claim 1, further comprising:
   an acquisition component that acquires type information representing the type of an image represented by the drawing information; and
   a switching component that switches execution and non-execution of conversion performed by the first conversion component and conversion performed by the second conversion component corresponding to the type of image represented by the type information acquired by the acquisition component.

8. The image processing apparatus according to claim 7, wherein the switching component performs switching to execute the conversion when the type of the image is other than a pixel image.

9. The image processing apparatus according to claim 1, wherein the multi-value range corresponds to a gray region, and the second conversion component converts the second color component values to be output by a black single colorant.

10. An image processing method which performs image processing for drawing information which includes image information and color correction information comprising:
   converting predetermined first color component values in a color space applied by the drawing information into second color component values in a different color space while being corrected by the color correction information;
   determining whether the second color component values fall within a predetermined multi-value range; and
   converting the second color component values into a single color corresponding to the range when the second color component values fall within the range.

11. The image processing method according to claim 10, wherein the multi-value range corresponds to a gray region, and the second conversion converts the second color component values to be output by a black single colorant.

* * * * *